United States Patent [19]

Stacey

[11] 4,318,702
[45] Mar. 9, 1982

[54] SHIFTING MECHANISM FOR OUTBOARD MOTORS

[76] Inventor: John C. Stacey, 109 Elm St., Stonington, Conn. 06378

[21] Appl. No.: 111,247

[22] Filed: Jan. 11, 1980

[51] Int. Cl.³ .............................................. F16D 23/02
[52] U.S. Cl. ........................................ 440/75; 440/86
[58] Field of Search .................. 192/114 T, 21, 48.91; 74/378; 440/75, 84, 86

[56] References Cited

U.S. PATENT DOCUMENTS 3,539,044 11/1970 Grimstad ............................. 192/21
3,543,896 12/1970 Mooney ................................ 192/21

Primary Examiner—Frank Sever
Attorney, Agent, or Firm—Albert W. Hilburger

[57] ABSTRACT

An improved drive mechanism for an outboard motor which utilizes a shifting mechanism for selective movement between idle and forward and reverse modes. In a conventional construction, a drive shaft pinion rotates constantly and drives a pair of opposed bevel gears freely rotatable on the propeller shaft. An element of the shifting mechanism called a shifter is splined to the propeller shaft between the bevel gears and has a pair of integral dogs positioned at diametrically opposite locations on its opposed faces which are engageable, respectively, with cooperating lands integral with the bevel gears. Unlike the conventional construction in which the mating surfaces of the dogs on the shifter and the lands on the bevel gears lie in planes generally parallel to the axis of the propeller shaft, the dogs and the lands in the present invention have been formed such that their mating surfaces all lie generally in planes which form an acute angle relative to an axis of the propeller shaft.

1 Claim, 8 Drawing Figures

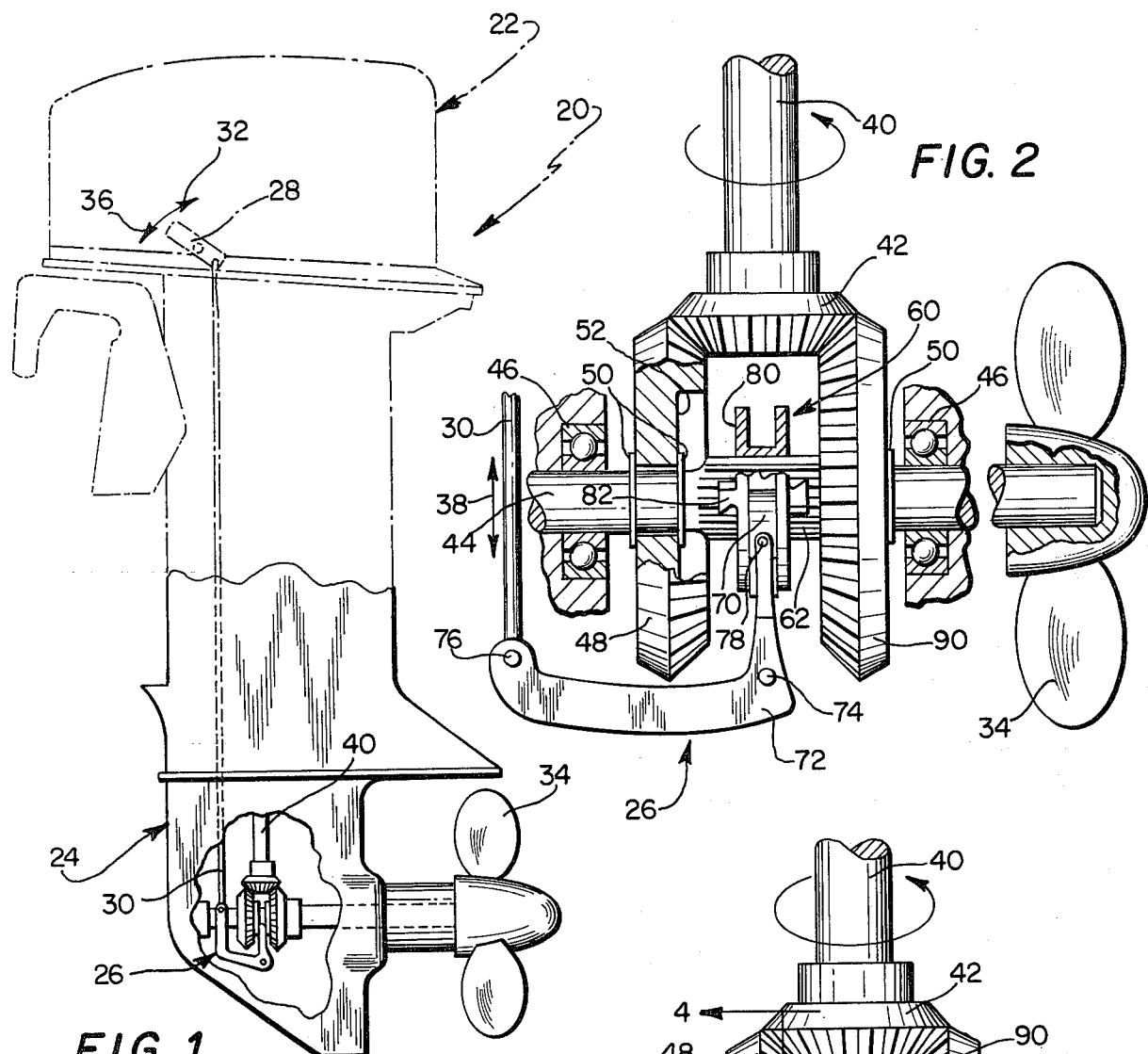
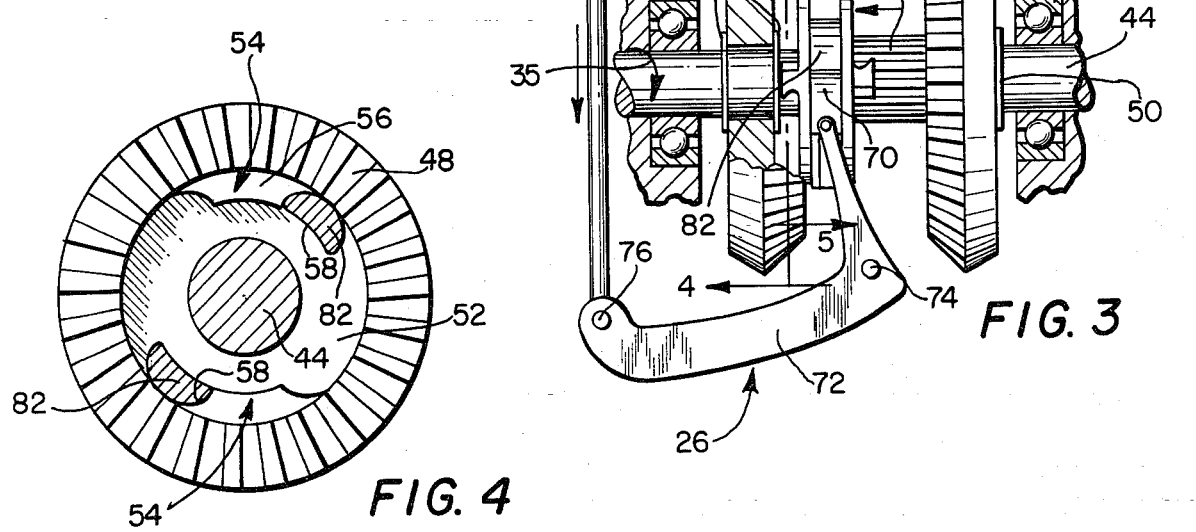

SHIFTING MECHANISM FOR OUTBOARD MOTORS

BACKGROUND OF THE INVENTION

1. Field of Invention

This invention relates generally to outboard motors and, specifically, to improvements in the shifting mechanisms for outboard motors which enable an operator to selectively choose forward, neutral, or reverse gear.

2. Description of the Prior Art

The inventor has had considerable experience with two popular makes of outboard motors and, particularly, with models manufactured between 1964 and the present time. He has found these motors to be excellent in substantially every category. However, there has been one area of difficulty which has persisted, at least within the realm of experience of himself and his associates. Specifically, it has been his experience that the shifting mechanisms of new motors often fail within a reasonably short period after being placed in service, oftentimes while the period of the warranty is still in effect. As time passes, with added usage and resultant wear, it becomes more and more difficult for an operator to maintain the shifting mechanism engaged in forward gear. Because reverse gear is used much less frequently than forward gear, breakdowns in that mode do not usually occur as readily. However, even with the reverse gear, eventually the wear will become such that the shifting mechanism will fail to maintain the reverse position.

In constructions which are known or commonly used, drive mechanisms for outboard motors utilize a shifting mechanism for selective movement between idle and forward and reverse modes of operation. In such conventional constructions, the so-called lower unit of an outboard motor incorporates a drive shaft pinion which rotates constantly and drives a pair of opposed bevel gears which are freely rotatable on the propeller shaft. A shifter is splined to the propeller shaft between the bevel gears and has a pair of integral dogs positioned at diametrically opposite locations on its opposed faces which are engageable, respectively, with mating lands integral with the bevel gears. The mating lateral surfaces of the dogs and lands, respectively, as conventionally known, lie in planes generally parallel to the axis of the propeller shaft.

The lateral and outer surfaces of the dogs and of the lands lie in generally transverse planes which intersect at an edge. In a new motor, the edge defined by the intersection between the lateral and outer surfaces is relatively sharp and clearly defines the limits of the respective surfaces. Hence, when the dogs of the shifter and corresponding lands of the bevel gears are brought into engagement, they remain in engagement until they are selectively disengaged by the operator. However, with continued usage, the lateral and outer surfaces become worn as does the edge between them. Such wear causes the mating surfaces of the dogs on the shifter and the lands on the bevel gears to slide relative to one another and, eventually, to slip apart and prevent further engagement.

Various attempts have been made by the manufacturers and operators of the motors to correct the above-described condition. In some instances, a spring pressed ball and associated detent have been employed to hold the shifter in a position such that its dogs are forced to maintain engagement with the lands on the bevel gear. In other instances, a stop or detent on the link of the upper shift control or operating handle adjacent the powerhead of the motor has been employed to aid against the dogs on the shifter from disengaging the lands on the bevel gear. Various and sundry adjustments have also been employed on the upper shift control or operating handle in its operative movement between the forward, neutral, and reverse positions. In most instances, these prior corrective approaches to the problem have been expensive, complex, difficult to maintain, and have generally failed to solve the basic problem.

SUMMARY OF THE INVENTION

It was with recognition of the need and of the state of the prior art that the present invention was conceived. Specifically, the aforesaid problem has been solved by undercutting or reforming the dogs on the shifter and the lands on the bevel gears such that their respective mating surfaces all lie generally in planes which form an acute angle relative to an axis of the propeller shaft. By use of such a construction, it has been found that when the mutually engaging dogs and lands are moved by the operator into the engaging position, they remain so engaged until such time that the operator chooses to have them become disengaged. Subsequent and extensive wear of the lateral surfaces and outer surfaces of the dogs and of the lands so modified, even at their intersecting edges, has not been found to reduce the effectiveness of the new construction notwithstanding extended periods of operation of the outboard motor.

Furthermore, as compared with the various prior attempts to solve the problem as stated above, the present invention is of simplified construction and utilizes no additional parts than conventional constructions. Indeed, the invention utilizes existing components and it can be applied to existing motors with a minimum of expense. A most important feature of the invention, however, is the substantial reduction in maintenance experienced in comparison to that presently required by the known motors which have exhibited the problem.

Other and further features, objects, advantages, and benefits of the invention will become apparent from the following description taken in conjunction with the following drawings. It is to be understood that both the foregoing general description and the following detailed description are exemplary and explanatory but are not restrictive of the invention. The accompanying drawings, which are incorporated in and constitute a part of this invention, illustrate one embodiment of the invention, and together with the description, serve to explain the principles of the invention.

BRIEF DESCRIPTION OF THE DRAWINGS

In the drawings:

FIG. 1 is a side elevation view of an outboard motor incorporating the invention illustrating its upper portions in phantom and with certain parts cut away;

FIG. 2 is a side elevation view of the lower unit of the outboard motor illustrated in FIG. 1 with certain parts cut away and in section;

FIG. 3 is a side elevation view similar to FIG. 2 illustrating the shifting mechanism of the outboard motor in the forward mode;

FIG. 4 is a cross section view taken generally along line 4—4 in FIG. 2;

DESCRIPTION OF THE PREFERRED EMBODIMENTS

Figure 5:
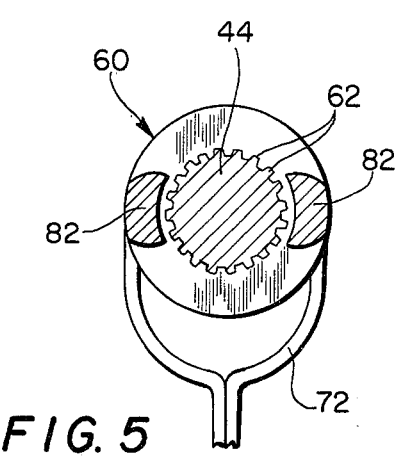
FIG. 5 is a cross section view taken generally along line 5—5 in FIG. 2.

Refer now to the drawings and initially to FIG. 1 which is generally illustrative of an outboard motor 20 embodying the invention. As illustrated in FIG. 1, the outboard motor 20 includes a powerhead 22 and a lower unit 24. As in conventional practice, the outboard motor 20 of the invention has a forward mode, a neutral mode, and a reverse mode, all of which are provided by means of a gearshift mechanism 26 located within the lower unit 24.

An upper shift handle 28 adjacent the powerhead 22 is pivotally mounted thereon so as to actuate a shift rod 30 which, in turn, serves to selectively shift the gearshift mechanism 26 between the neutral or idle mode (see FIG. 2), the forward mode (see FIG. 3) and the reverse mode (not shown). Specifically, when the shift handle 28 is rotated in the clockwise direction, that is, in the direction of an arrow 32, a propeller 34 is caused to rotate in the direction of an arrow 35 (FIG. 3) to provide forward motion to the boat on which the motor 20 is mounted. Similarly, when the shift handle 28 is rotated in a counterclockwise direction, that is, in the direction of an arrow 36, the propeller 34 is driven in a reverse direction which results in a backward motion of the boat on which the motor 20 is mounted. The up and down motion of the shift rod 30 may more clearly be seen with reference to FIG. 2 and a double arrowhead 38.

In accordance with the invention, a drive mechanism for the outboard motor comprises a drive shaft rotatable about a first axis; a pinion fixed on said drive shaft for rotation therewith; a propeller shaft rotatable about a second axis transverse to said first axis; a propeller fixed at one end of said propeller shaft for rotation therewith; a bevel gear drivingly engaged with said pinion being freely rotatable on said propeller shaft and including a first surface which lies generally in a plane perpendicular to said axis; a pair of lands integral with said bevel gear extending axially outwardly from said first surface at diametrically opposite locations equally distant from said second axis and having extreme outer surfaces lying generally in a plane parallel to and spaced from said first surface and having lateral surfaces lying generally in planes transverse to said first surface and said outer surfaces of said first lands; a shifter splined to said propeller shaft for axial movement thereon and rotatable therewith and including a second surface which lies generally in a plane perpendicular to said second axis and which faces said first surface; a pair of dogs integral with said shifter extending axially outwardly from said second surface at diametrically opposite locations equally distant from said second axis and having extreme outer surfaces lying generally in a plane parallel to and spaced from said second surface and having lateral surfaces lying generally in planes transverse to said second surfaces and said outer surfaces of said dogs, said lateral surfaces of said dogs being engageable with said lateral surfaces of said lands; said shifter being movable on said propeller shaft between a neutral position whereat said lands and said dogs are disengaged and an operative position whereat said lands and said dogs are engaged thereby coupling said bevel gear to said second shaft for rotating said propeller; and said lands and said dogs being formed that the cross-sectional area of each of said lands and said dogs at its respective base is less than its associated said extreme outer surface, said lateral surfaces, respectively, lying generally in planes which form an acute angle relative to said second axis.

As embodied herein, and with particular reference initially to FIGS. 1 and 2, a drive mechanism for the outboard motor 20 comprises a drive shaft 40 which, during operation of the motor, is continually rotated about a first, generally vertical, axis. A pinion 42 is fixed on the lower end of the drive shaft for rotation therewith. A propeller shaft 44 is mounted by means of a pair of spaced apart support bearings 46 for rotation about a second axis transverse to the axis of the drive shaft and is positioned within the lower unit 24. The propeller 34 is pinned or otherwise suitably fixed at one end of the propeller shaft 44 for rotation therewith.

A forward bevel gear 48 is journaled on the propeller shaft 44 for relative rotation on the propeller shaft and is drivingly engaged with the pinion 42. Thus, a pair of C-spring collars 50, biased into engagement with suitable annular grooves (not shown) on the shaft 44, may be employed to prevent axial movement of the bevel gear 48 along the propeller shaft 44 while retaining its freedom of rotation relative to the shaft.

The bevel gear 48 includes a first surface 52 (FIGS. 2 and 4) which lies generally in a plane perpendicular to the axis of the propeller shaft 44. Integral with the bevel gear 48 and extending axially outwardly from the first surface 52 at diametrically opposite locations but equally distant from the propeller shaft 44 is a pair of lands 54. The lands 54 are partially defined by extreme outer surfaces 56 which lie generally in a plane parallel to and spaced from the first surface 52 and by lateral surfaces 58 which lie generally in planes transverse to the first surface 52 and the outer surfaces 56.

With particular reference now to FIGS. 2 and 5, a shifter 60 is mounted on the propeller shaft 44 by means of splines 62 to permit axial movement of the shifter along the shaft while assuring their rotation as a unit. As particularly well seen in FIGS. 6 and 7, the shifter 60 includes a central body portion 64 and a pair of spaced annular flanges 66 which define a cavity 68 within which is positioned a crescent-shaped cradle 70 (see FIG. 2). A shift lever 72 is pivotally mounted as at 74 to the frame of the motor 20. At an end 76, the shift lever 72 is pivotally mounted to the base of the shift rod 30 and at its other end 78, the shift lever is pivotally mounted to the cradle 70. In this manner, movement of the upper shift handle 28 in a direction of the arrow 32 serves to move the shifter 60 along the propeller shaft 44 from the neutral position indicated in FIG. 2 to the forward position indicated in FIG. 3.

Although the detailed description of the invention is generally restricted to movement of the shifter 60 between its neutral position and the forward position, as the operative position, it is to be understood that the operative position could just as properly be the reverse position. Only for purposes of simplicity has the description been so restricted.

Figure 6:
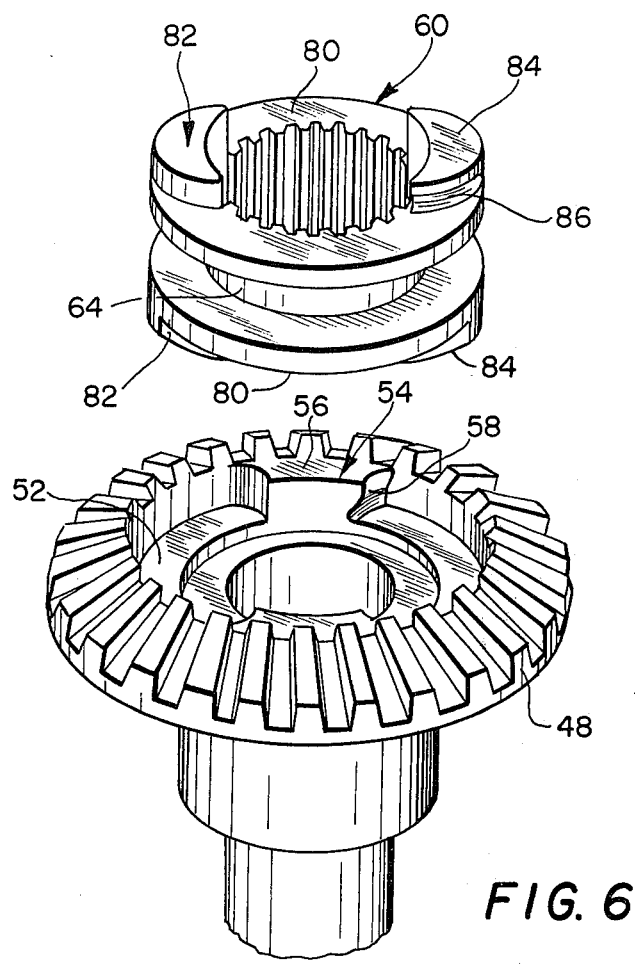
FIG. 6 is an exploded perspective view of certain elements of the outboard motor illustrated in FIG. 1 which embody the invention.
Figure 7:
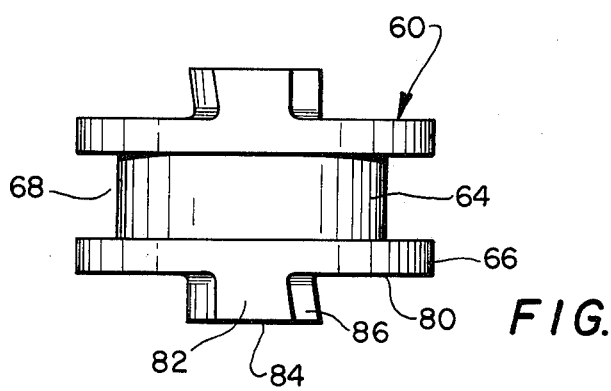
FIG. 7 is a detailed side elevation view of one of the elements illustrated in FIG. 6.

With continued reference especially to FIGS. 6 and 7, the shifter 60 is seen to include a second surface 80 which lies generally in a plane perpendicular to the axis of the propeller shaft 44 and, additionally, faces the first surface 52 on the forward bevel gear 48 (FIGS. 2, 3, and 6). The shifter 60 also includes a pair of dogs 82 which are integral with the flanges 66 and extend axially outwardly from the second surface 80 at diametrically opposite locations but equally distant from the axis of the propeller shaft 44 (see FIGS. 4 and 5). The dogs 82 are partially defined by extreme outer surfaces 84 (see FIG. 7) which lie generally in a plane parallel to and spaced from the second surfaces 80. The dogs 82 are also partially defined by lateral surfaces 86 which lie generally in planes transverse to the second surfaces 80 and to the outer surfaces 84. When the shifter 60 is moved from the neutral position (FIG. 2) to the forward position (FIG. 3), the lateral surfaces 86 of the dogs 82 engage the lateral surfaces 58 of the lands 54. In this manner, rotation of the drive shaft 40 is imparted, through the pinion 42 and the forward bevel gear 48, to the propeller shaft 44 and the propeller 34.

Figure 8:
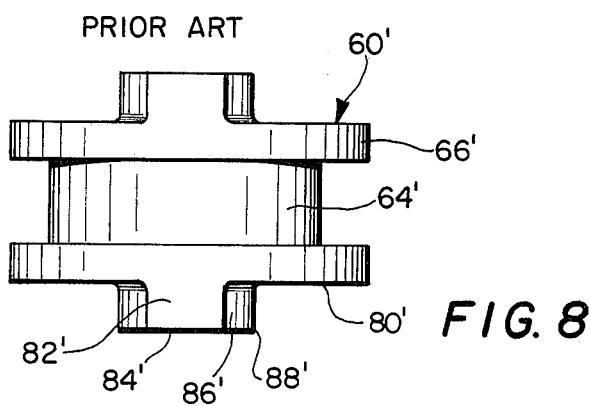
FIG. 8 is a side elevation view, similar to FIG. 7, which is illustrative of the prior art.

At this stage of the description, it is considered helpful for an understanding of the invention to describe a conventional construction of the shift mechanism. For this purpose, kindly refer to FIG. 8 which is a showing of a shifter 60' which is illustrative of the prior art. It will be understood that in the description of the prior art reference numerals will be similar to those employed in FIGS. 1–7, but will be "primed" in order to distinguish between the elements of the present invention and the elements of the prior art. In conventional practice, then, the shifter 60' was provided with dogs 82' having extreme outer surfaces 84' which lay generally in planes parallel to and spaced from the second surfaces 80'. The dogs 82' were also partly defined by lateral surfaces 86' which lay generally in a plane perpendicular to the planes of the second surface 80' and outer surface 84' and generally parallel to the axis of the propeller shaft. With frequent usage of the outboard motor 20 and its gear shift mechanism 26, it has been found that an edge 88', which defines the intersection between the outer surface 84' and the lateral surface 86' becomes worn and rounded. The lateral surface 86', itself, would also become worn from constant engagement and disengagement from the corresponding lateral surface on its mating first land on the forward bevel gear. At some point after moderate operation of the gear shift mechanism 26 for a moderate period of time, the wear on the lateral surface 86' and at the edge 88' became sufficiently great that the shifter 60' would no longer remain in engagement with its associated forward bevel gear.

With particular reference once again to FIGS. 6 and 7, it is seen that the lands 54 and the dogs 82 are formed in such a manner that the cross-sectional area of each at its base, that is, at its intersection, respectively, with the first surface 52 and with the outer surface 84 is less than its associated extreme outer surface, 56 and 84, respectively. Indeed, the lateral surfaces 58 and 86 of the lands 54 and dogs 82, respectively, are formed so as to lie generally in planes which form an acute angle relative to the propeller shaft.

Although the invention has been described with respect to an improved shifter 60 and its associated forward bevel gear 48, similar improvements can be applied also to the opposite portion of the shifter 60 and its associated reverse bevel gear 90. Thus, in all respects, the benefit achieved with respect to a shift in mode between neutral and forward can similarly be achieved with respect to a shift in mode between neutral and reverse.

The invention, in its broader aspects, is not limited to the specific details shown and described; departures may be made from such details without departing from the principles of the invention and without sacrificing its chief advantages.

What is claimed is:

1. A drive mechanism for an outboard motor utilizing shifting apparatus comprising:
   a drive shaft rotatable about a first axis;
   a pinion fixed on said drive shaft for rotation therewith;
   a propeller shaft rotatable about a second axis transverse to said first axis;
   a propeller fixed at one end of said propeller shaft for rotation therewith;
   a bevel gear drivingly engaged with said pinion being freely rotatable on said propeller shaft and including a first surface which lies generally in a plane perpendicular to said second axis;
   a shifter splined to said propeller shaft for rotation therewith and being selectively movable axially thereon between an operative position drivingly connecting said drive shaft and said propeller shaft and a neutral position in which said drive shaft and said propeller shaft are disconnected and including a second surface which lies generally in a plane perpendicular to said second axis and which faces said first surface; and
   means for substantially reducing wear of said shifting apparatus including a pair of lands integral with said bevel gear extending axially outwardly from said first surface at diametrically opposite locations equally distant from said second axis and having extreme outer surfaces lying generally in a plane parallel to and spaced from said first surface and having lateral surfaces lying generally in planes transverse to said first surface and said outer surfaces of said lands and a pair of dogs integral with said shifter extending axially outwardly from said second surface at diametrically opposite locations equally distant from said second axis and having extreme outer surfaces lying generally in a plane parallel to and spaced from said second surface and having lateral surfaces lying generally in planes transverse to said second surfaces and said outer surfaces of said dogs, said lateral surfaces of said dogs being engageable with said lateral surfaces of said lands, said mutually engageable lateral surfaces of said lands and of said dogs, respectively, lying generally in planes which form a predetermined acute angle relative to said second axis.

* * * * *